United States Patent
Hwang et al.

(10) Patent No.: US 9,613,027 B2
(45) Date of Patent: Apr. 4, 2017

(54) FILLED TRANSLATION FOR BOOTSTRAPPING LANGUAGE UNDERSTANDING OF LOW-RESOURCED LANGUAGES

(71) Applicant: Microsoft Technology Licensing, LLC, Redmond, WA (US)

(72) Inventors: Mei-Yuh Hwang, Beijing (CN); Yong Ni, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 14/074,358

(22) Filed: Nov. 7, 2013

(65) Prior Publication Data

US 2015/0127319 A1    May 7, 2015

(51) Int. Cl.

| | |
|---|---|
| G06F 17/28 | (2006.01) |
| G06F 17/00 | (2006.01) |
| G06F 17/20 | (2006.01) |
| G06F 17/21 | (2006.01) |
| G06F 9/44 | (2006.01) |
| G06Q 10/00 | (2012.01) |
| G06Q 50/00 | (2012.01) |
| G10L 15/00 | (2013.01) |
| G10L 13/00 | (2006.01) |

(52) U.S. Cl.
CPC .................... *G06F 17/28* (2013.01)

(58) Field of Classification Search
USPC ..... 704/2, 4, 8, 257, 260, 10, 235; 715/236; 717/117; 705/7.29, 2
See application file for complete search history.

(56) References Cited

U.S. PATENT DOCUMENTS

| | | | |
|---|---|---|---|
| 8,682,669 B2* | 3/2014 | Suendermann | G10L 15/063 379/88.01 |
| 2002/0128821 A1* | 9/2002 | Ehsani | G10L 15/193 704/10 |

(Continued)

OTHER PUBLICATIONS

Singhal, Amit, "The Science Fiction Behind Search", Published on: Jul. 2011, Available at: http://www.google.com/think/articles/the-science-fiction-behind-search.html.

(Continued)

*Primary Examiner* — Pierre-Louis Desir
*Assistant Examiner* — Neeraj Sharma

(57) ABSTRACT

Annotated training data (e.g., sentences) in a first language are used to generate annotated training data for a second language. For example, annotated sentences in English are manually collected first, and then is used to generate annotated sentences in Chinese. The annotated training data includes slot labels, slot values and carrier phrases. The carrier phrases are the portions of the training data that is outside of a slot. The carrier phrases are translated from the first language to one or more translations in the second language. The translations may include machine translations as well as human translations. Entities for the slot values are determined for the translated sentences using content sources that include locale-dependent entities. The determined entities are used to fill the slots in the translations of the second language. All or a portion of the resulting sentences may be used for training models in the second language.

20 Claims, 10 Drawing Sheets

(56) References Cited

U.S. PATENT DOCUMENTS

| | | | |
|---|---|---|---|
| 2008/0040659 A1* | 2/2008 | Doyle | G06F 17/30905 715/236 |
| 2009/0182549 A1* | 7/2009 | Anisimovich | G06F 17/2755 704/4 |
| 2010/0076746 A1 | 3/2010 | Aikawa et al. | |
| 2010/0198581 A1* | 8/2010 | Ellis | G06F 17/248 704/4 |
| 2012/0191457 A1* | 7/2012 | Minnis | G10L 13/10 704/260 |
| 2013/0073276 A1* | 3/2013 | Sarikaya | G06F 17/289 704/2 |
| 2014/0122055 A1* | 5/2014 | Hobson | G06F 17/218 704/8 |
| 2014/0278425 A1* | 9/2014 | Jost | G10L 15/063 704/257 |
| 2014/0282393 A1* | 9/2014 | Coalson | G06F 8/31 717/117 |
| 2015/0106157 A1* | 4/2015 | Chang | G06F 17/27 705/7.29 |
| 2015/0161111 A1* | 6/2015 | Lueck | G06F 17/30899 705/2 |
| 2015/0262580 A1* | 9/2015 | Bisani | G10L 15/26 704/235 |

OTHER PUBLICATIONS

Liang, et al., "An End-to-End Discriminative Approach to Machine Translation", In Proceedings of the 21st International Conference on Computational Linguistics and the 44th Annual Meeting of the Association for Computational Linguistics, Jul. 2006, 8 pages.

Gao, et al., "MARS: A Statistical Semantic Parsing and Generation-Based Multilingual Automatic tRanslation System", In Journal of Machine Translation, vol. 17, Issue 3, Jan. 2002, 28 pages.

Phillips, Aaron B., "Modeling Relevance in Statistical Machine Translation: Scoring Alignment, Context, and Annotations of Translation Instances", In Ph.D. Thesis Defense—Submitted in Partial Fulfillment of the Requirements for the Degree of Doctor of Philosophy in Language and Information Technologies, Jan. 2012, 150 pages.

Finch, et al., "Dynamic Model Interpolation for Statistical Machine Translation", In Proceedings of the Third Workshop on Statistical Machine Translation, Jun. 19, 2008, 8 pages.

Tiedemann, Jorg, "MatsLex—A Multilingual Lexical Database for Machine Translation", In Proceedings of the Third International Conference on Linguistic Resources and Evaluation, May 29, 2002, 4 pages.

Avramidis, et al.,"A Richly Annotated, Multilingual Parallel Corpus for Hybrid Machine Translation" In Proceedings of the Eighth International Conference on Language Resources and Evaluation, May 23, 2012, pp. 5.

He, et al., "Multi-Style Adaptive Training for Robust Cross-Lingual Spoken Language Understanding", In IEEE International Conference on Acoustics, Speech, and Signal Processing, May 2013, 5pages.

* cited by examiner

FILLED TRANSLATION FOR BOOTSTRAPPING LANGUAGE UNDERSTANDING OF LOW-RESOURCED LANGUAGES

BACKGROUND

There are many applications for using speech recognition including searching, command and control, spoken dialog systems, natural language understanding systems, and the like. These speech systems may use statistical models that utilize labeled data. Collecting this data is time consuming and costly. For example, linguists are used to define and refine the annotation guidelines in addition to labeling the data. Additional time and expense is incurred when the speech system is expanded to support multiple languages.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Annotated training data (e.g., sentences) in a first language are used to create annotated training data for a second language. For example, annotated sentences in English are obtained and used to generate annotated sentences in Chinese. The annotated training data includes slot labels, slot values and carrier phrases. The carrier phrases are the portions of the training data that is outside of a slot in a sentence. The carrier phrases are translated from the first language to one or more translations in the second language. The translations may include machine translations as well as human translations. Entities for the slot values are determined for the translated sentences using content sources that include locale-dependent entities. The determined entities are used to fill the slots in the translations of the second language. All or a portion of the resulting sentences may be used for training models in first language and/or the second language.

DETAILED DESCRIPTION

Figure 1:
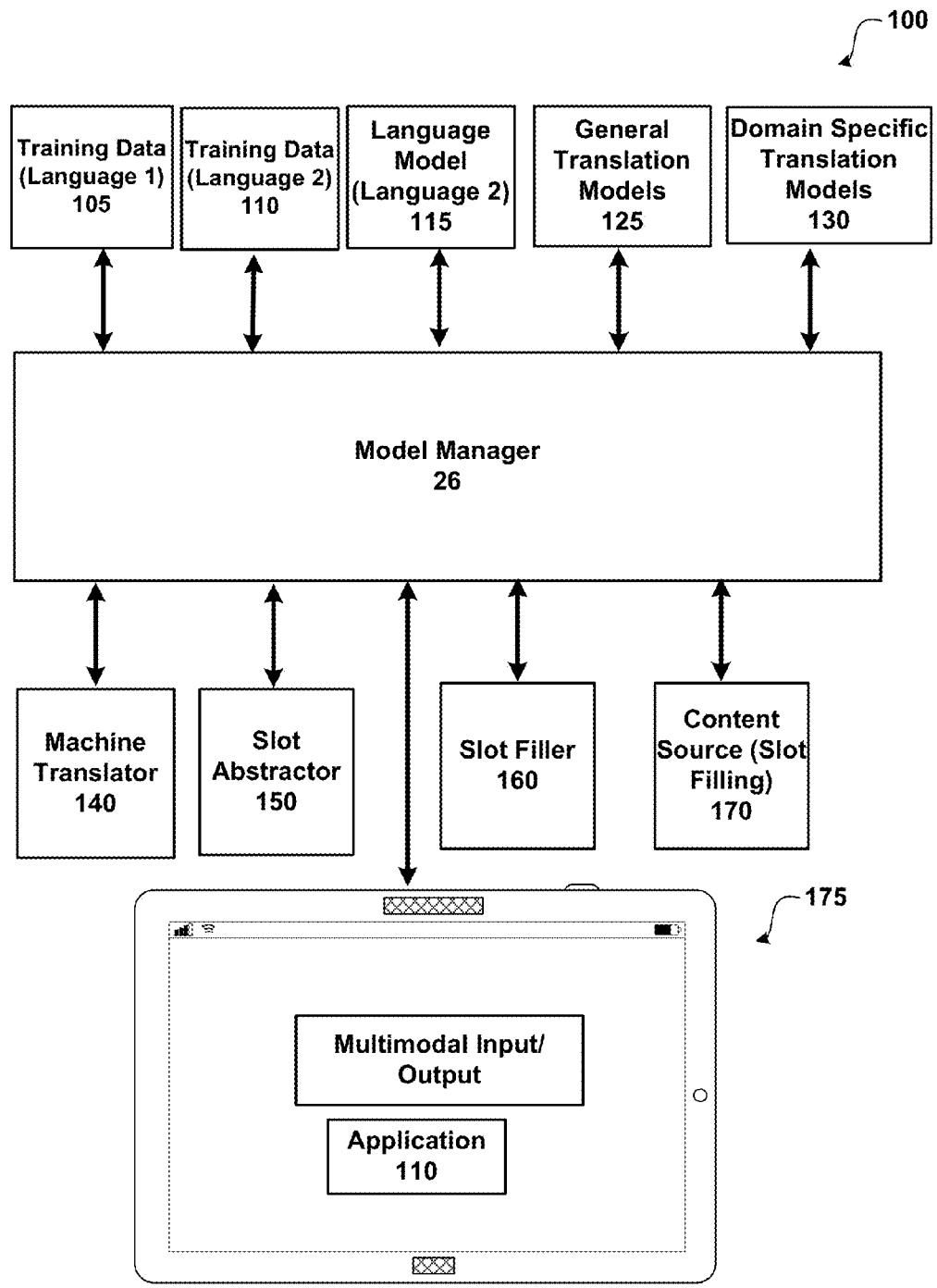
FIG. 1 shows a system for creating training data in a different language from training data in a first language.

Referring now to the drawings, in which like numerals represent like elements, various embodiment will be described.

FIG. 1 shows a system for creating training data in a different language from training data in a first language.

As illustrated, system 100 includes model manager 26, training data 105, training data 110, language model 115, general translation models 125, domain specific translation models 130, machine translator 140, slot abstractor 150, slot filler 160, slot-label remover 151, content sources 170, application 110 (e.g. a speech related application) and touch screen input device 175.

Model manager 26 is configured to generate annotated training data (e.g., sentences) in a second language model from annotated training data in a first language. For example, annotated sentences in a first language (e.g., English) are obtained from training data 105. According to an embodiment, the annotated training data 105 includes sentences that include slot labels, slot values and carrier phrases. The carrier phrases are the portions of the training data that is outside of a slot label in a sentence. Generally, a slot is a predefined unit of information that is relevant to the action that is expected to be included in utterances for a particular subject area (e.g., travel, weather, movies, music, . . . ). For example, slots related to travel may comprise slots for departure, location, departure time, arrival time, arrival destination, travel method, constraints (e.g., lowest cost, no layovers, etc.). Slots related to dining may comprise slots for cuisine type, time, party size, reservation needed, relative location (e.g., in walking distance, near a transit station, etc.), and the like. In a particular sentence or utterance, the slot label is the name that describes the predetermined unit of information being looked for (e.g., departure time, arrival time, party size, . . . ) and the slot value is value for the identified slot as determined from the utterance or sentence. For example, in the sentence "albums out <music_release_date> this week </music_release_date>" the carrier phrase is "albums out." The slot value is "this week" and the slot label is "music_release_date."

Model manager 26 is configured to use machine translator 140 to perform translations on the training data 105. Machine translator 140 may use one or more general translators (e.g., Bing®, Google® . . . ) that use general translation models 125 as well as domain specific translators that use domain specific translation models 130. In some cases, a general translator may translate a domain specific phrase poorly since the general translator is trained on general domains and is not trained for domain specific words. Model manager 26 may also receive human translations for all or a portion of the annotated training data. For example, partial human translations may be obtained for a portion (e.g., 2000-5000 sentences) of the training data 105.

The translations may be for a portion of each of the sentences in the training data or the entire sentence. For example, the translations may be for the carrier phrases in the training data 105 without translating the slot labels and the slot values in the training data. The translations may also be for the slot values and the carrier phrases in the sentences (straight translation).

One or more translations may be obtained for each sentence that is translated. For example, the translations for a sentence that are determined to be accurate (e.g., according to a score output by machine translator 140 or some other method) may be selected. In this way, one training sentence in the first language becomes multiple training sentences in the second language.

Slot abstractor 150 is configured to perform slot-tag abstraction on all or a portion of the training data. Slot abstractor 150 examines the carrier phrases, the slot labels and the slot values within training data, and replaces the slot labels and the slot values with an abstract token to represent that slot category. For example, the sentence "albums out <music_release_date> this week </music_release_date>" is transformed by slot abstractor 150 to "albums out ${music_release_}". Generally, an abstract token, such as ${music_release_} is determined to be an out-of-vocabulary (OOV) word for a machine translator. An OOV word is a word that is generally not included in the training set for the machine translator. When an OOV token is encountered by a machine translator, the OOV token is output as encountered (e.g., not translated). According to an embodiment, a translation model and language model are trained to recognize the tokens (See FIGS. 2-4 and related discussion). In contrast, the Slot-Label Remover 151 removes the slot labels in the training sentence in order to get a proper translation without the disturbance of the slot tags.

Slot filler 160 is configured to replace the slot values or the abstract tokens in the training data with one or more entities. As used herein, the term "entity" refers to a possible value for a slot value. Slot values may or may not be locale-dependent entities. Locale-dependent entities are slot values that are dependent upon the locale(s) of the second language. For example, city entities are different for a locale in China as compared to the city entities in America or Taiwan. As another example, some music entities and movie entities may be locale-dependent entities. For instance, some music and movies may be specific to the locale of the second language. Some slot values may be locale-independent entities. For example, some movie entities and music entities may be the same in China as in America.

Entities for the slot values are determined for the translated sentences using content sources 170 that include locale-dependent entities. One or more entities may be used. For example, if two entities are used, two sentences are created for training data in the second language.

Content source 170 includes entities that are used to fill slots. The content source may include one or more types of content. For example, content source may include content such as, but not limited to: music content (e.g., song names, artist names, . . . ); movie content (e.g., movie names, actor names, director names, . . . ); travel content (e.g., airline names, . . . ); weather content (e.g., city names, average temperatures, . . . ) and the like. Content source 170 represents one or more content sources. According to an embodiment, content source 170 includes locale-dependent entities. For example, music content for one country would generally include different music content compared to music content for another country. The content source 170 may be constructed to include content for specific slot types or the content source may already exist for the slot type. For example, search engines may be used to locate content, Uniform Resource Locators (URLs) may be crawled to fine related content to a domain of interest, and the like. The content source(s) 170 may also be created manually.

All or a portion of the training data that is created in the second language may be used to train a model, such as language model 115. A model (e.g., language model 115) includes statistical information that is used in speech recognition and conversational understanding (CU) to recognize the words in an utterance or sentence.

In order to facilitate communication with the model manager 26, one or more callback routines, may be implemented. According to one embodiment, application 110 is a multimodal application that is configured to receive speech input (e.g. utterances) and to perform an action in response to receiving the utterance. Application 110 may also receive input from a touch-sensitive input device 175 and/or other input devices. For example, voice input, keyboard input (e.g. a physical keyboard and/or SIP), video based input, and the like. Application program 110 may also provide multimodal output (e.g. speech, graphics, vibrations, sounds, . . . ).

Model manager 26 may provide information to/from application 110 in response to user input (e.g. speech/gesture). For example, a user may say a phrase to identify a task to perform by application 110 (e.g. performing a search, selecting content, buying an item, identifying a product, . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device 175 that detects when a touch input has been received (e.g. a finger touching or nearly teaching the touch screen).

Model manager 26 may be part of a speech system, such as a dialog system that receives speech utterances and is configured to extract the meaning conveyed by a received utterance. More details are provided below.

Figure 2:
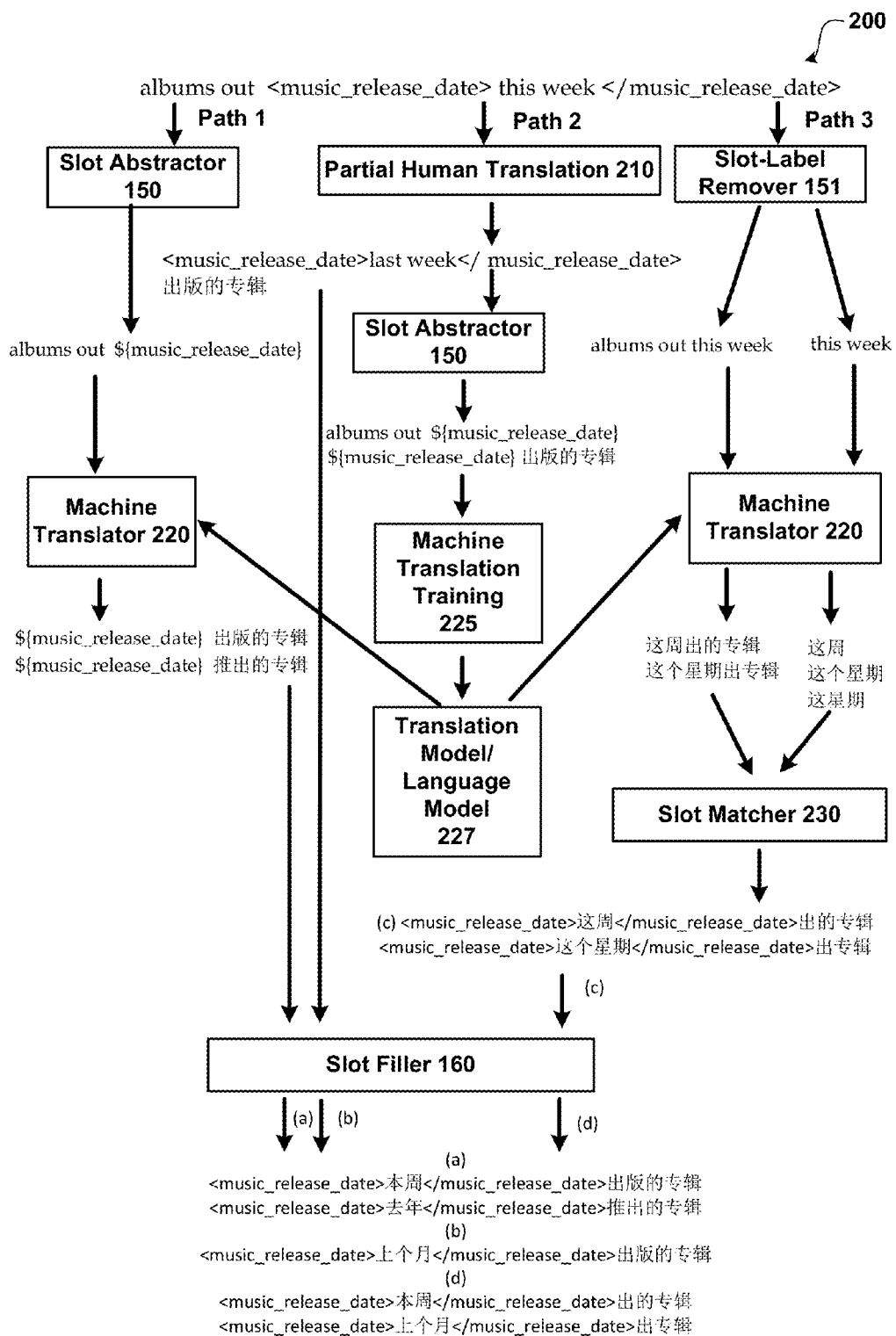
FIG. 2 shows a system including an example flow of training data received in a first language for creating training data in a second language.

FIG. 2 shows a system 200 including an example flow of training data received in a first language for creating training data in a second language.

The annotated sentence "albums out <music_release_date> this week </music_release_date>" is used as an example sentence through the paths shown in FIG. 2.

In path 1, the example sentence is tokenized by slot abstractor 150. Slot abstractor 150 transforms the input training sentence into a format where slot values in the training sentence are replaced by a token that indicates the slot type. For example, the sentence "albums out <music_release_date> this week </music_release_date>" is transformed by slot abstractor 150 to "albums out ${music_release_}". Slot abstractor 150 in path 1 transforms the example sentence to "albums out ${music_release_date}."

Machine translator 220 in path 1 translates the abstract sentence to the target language. For example, in the current example, the English abstract sentence is translated to Chinese. According to an embodiment, machine translator 220 uses one or more bilingual phrase translation models (TM) and one or more target language models (LM). A bilingual TM offers multiple translation choices for each source phrase with learned probabilities, while an LM is used to set preference to the translated target sentence with the grammar of the target language. In the example shown in path 1, "albums out ${music_release_date}" becomes two translations: "${music_release_date}出版的专辑" and "${music_release_date} 推出的专辑."In the current example, the amount of training data for the second language is doubled compared to the first language. According to another embodiment, a human may be used for translating small amount of data in addition to machine translator 220.

Machine translator 220 may use a general translator (e.g., a general translation service provided by Bing®, Google® . . . ), a domain specific translator, or some combination of a general translator and a domain specific translator. A general translator provides translations from one language to another language independent of the subject area. A domain specific translator is a translator that provides translations from one language to another language for a particular domain (e.g., subject area such as: weather, travel, music, . . . ). For example, a domain specific translator for the weather subject area will be trained to translate a term in a sentence using a weather definition of the term as opposed to a more general definition of the term. In some cases, a general translator may translate a domain specific phrase poorly since the general translator is trained on general domains.

Depending on the models used by the translator, the abstract tokens may or may not be recognized and translated. For example, when using a general translator that uses the standard translation models and language models, the tokens will not be recognized.

Slot Filler 160 fills each abstract token (e.g., ${music_release_date}) with one or more entities. The entities may be obtained using different methods. For example, the entities may be automatically determined from a content source or search results. Entities may also be determined from a user. For example, some entities may be filled by a user whereas other entities are automatically determined. One or more entities may be used. According to an embodiment, an entity is randomly selected when the entity is automatically determined. In the current example, the training data created using path 1 is shown as training data (a).

Path 2 in FIG. 2 shows using partial human translation in creating training data and updating models used by a translator.

Generally, partial human translation includes receiving translations from a human for a portion of the training data (e.g., 2000-5000 sentences per domain). It is a partial translation, because only carrier phrases need to be translated, while slots will be abstracted. The portion of the training data may be selected using different methods. For example, a domain-selection algorithm may be used to select a subset of the training data used in models such that the selected subset of the data is more related to the domain of interest. This subset of data may be used to train an additional translation model (TM) and/or to train an additional language model (LM) (e.g., model 227) and used by a machine translator (e.g., machine translator 220) to more closely reflect the domain of interest.

According to an embodiment, the portion of each sentence that is translated by the human includes the carrier phrases but does not include translating the slot labels and the slot values. Word tokens need to be reordered manually properly when doing such translation. In the current example, the sentence "albums out <music_release_date> this week </music_release_date>" is translated to <music_release_date>last week</music_release_date>出版的专辑 . As can be seen, the human translator reordered some of the words based on the language of the translation. According to another embodiment, the portion of each sentence that is translated by the human may include all or a portion of the training data.

Slot filling using slot filler 160 may be performed on top of the human translations. Performing slot filling to the human partially translated data creates annotated training data that is generally of a high quality in the second language. Data set (b) is created from slot filling the partial human translations.

Slot abstractor 150 in path 2 may also perform abstraction on both the original sentence and the human translation. In the example that is shown in path 2, the sentence <music_release_date>last week</music_release_date> 出版的专辑 is abstracted to albums out ${music_release_data} and ${music_release_date}出版的 专辑 .

Machine translation training 225 is used to train a domain-specific TM and LM using such a parallel training set. After training, the abstract tokens (e.g., ${music_release_date}, ${date_range} and ${weather_condition}) would no longer be considered OOV anymore by the new translator since the tokens are recognized by the translator using the new model. Its translation is the same abstract token. But the abstract token is no longer OOV to the language model and hence LM can now score the translated sentence smoothly. Such a domain-specific TM/LM generally provides better domain-appropriate word and phrase translations for a domain as compared to a general translation model.

The translation model/language model 227 may also include general translation "rules" where tokens serve as placeholders, as in (weather in ${city}, ${city}的天气 ). The general TM(s) and LM(s) may still be used as background models to cover additional source words. Weighting parameters for different models may be used to tuned to achieve the best translation.

According to an embodiment, the trained domain-specific TM and LM (227) are combined with the general translator (e.g. machine translator 220). Instead of using a general translator in the machine translator 220 illustrated in path 1 and path 3, the new models (e.g., TM and LM trained using the partial human translations) may be used to determine the translations.

Path 3 shows using straight translation with slot filling.

In some cases, applying machine translation as shown in path 1 to a sentence results in a poor translation. For example, the English sentence, "Do I need to wear a <suitable_for> hat </suitable_for>" may be machine translated into tokenized sentences such as: 我需要穿 ${suitable_for}$ 吗 and 我需要戴 ${suitable_for}$ 吗 . The verb "wear" in English is equivalent to a different verb in Chinese depending on the object being worn. As slot filling is context independent, the verb and the noun in data set (a) may not be matched properly (e.g., 我需要穿 帽子吗 ).

Slot-Label Remover 151 strips the slot tags from the input sentence to create a new sentence. Slot-Label Remover 151 does not remove the slot value from the sentence. In the current example, the annotated sentence "albums out <music_release_date> this week <music_release_date>" is output by the Slot-Label Remover 151 as "albums out this week". Additionally it also extracts the slot values independently ("this week") for separate translation. The translated slot values are used by the Slot Matcher 230 to insert slot labels back into the translated sentence.

Machine translator 220 translates the phrases output by Slot-Label Remover 151 that is shown in path 3. Machine translator 220 may use a general translator or domain-specific translator or a combination of a general translator or domain-specific translator. More than one translation may be produced by translator 220. In the current example, "albums out this week" is translated to two phrases " 这 周出的专辑 " and " 这个星期出专辑 " and "this week" is translated to three phrases "这周" and "这个星期'" and "这星期." According to an embodiment, during the straight translation shown in path 3, the domain-specific TM and LM (model 227) are used by machine translator 220. For example, "play" as a verb has two Chinese translations (玩,放) where the former may be more common in the general translator, yet the latter is the right translation in the music domain. The general TM may not be clear which translation it should choose. The domain-specific TM, however, has a clear preference to tell the machine translator to choose the latter. This is similar for (album,相簿 ) vs. (album,专辑 ) in the music domain.

The sentences output by machine translator 220 do not include the slot labels. In the current example, the slot label <music_release_date> has been stripped from the input sentence by Slot-Label Remover 151 before translation. Different methods may be used by slot matcher 230 to recover the positions of slot tags. For example, word alignment may be performed using a word alignment model (IBM model 1, IBM model 2, Hidden Markov Model (HMM) . . . ) that is commonly used to in training machine translation. Another method that may be used is to obtain the translation alignment as determined by machine translator 220. Another method is to translate the input slot values separately as shown in the diagram, and then look for its occurrence in the translated full sentence. For example, translating "hat" to "帽子". Now looking for 帽子 in 我需要戴上一顶帽子吗, it can be seen that 我需要戴上一顶 <suitable_for>帽子</suitable_for>吗. In the current example, slot matcher 230 outputs "(c)<music_release_date>这周<music_release_date>出的专辑 and <music_release_date>这个星期' <music_release_date>出专辑 that is illustrated as annotation data set (c). Data set (c) is similar to results output by performing human single-trip translation, except that machines are used for translation. Instead of being limited by human translators, machines are employed for scalability.

Slot filler 160 performs slot filing on data set (c) creating data set (d).

All or a portion of the different data sets may be combined and used as the final training data that is in the translated language (e.g. Chinese). According to an embodiment, four data sets (a)-(d) are combined to create the annotated training data that is used to train the slot tagging model for the second language. Depending on the quality of each data set, they may be combined with different weights, or pruned further by appropriate models. According to another embodiment, data sets (a)-(c) are combined. According to yet another embodiment, path 1 may be applied to slots that are locale-dependent such as city names, while straight translation shown in path 3 may be used for universal slot types such as <suitable_for> nouns (sweater, umbrella, sandals, etc.) While the methods shown in the different paths (path 1, path 2 and path 3) of FIG. 2 are applied to at the sentence level, different methods that are shown by the different paths may be applied to a portion of a sentence. One method may be applied to a portion of the sentence whereas one or more other methods may be applied to the remaining portion of the sentence. For example, straight translation may be applied to one or more slots within a sentence and machine translation may be applied to the other slots in the sentence.

Figure 3:
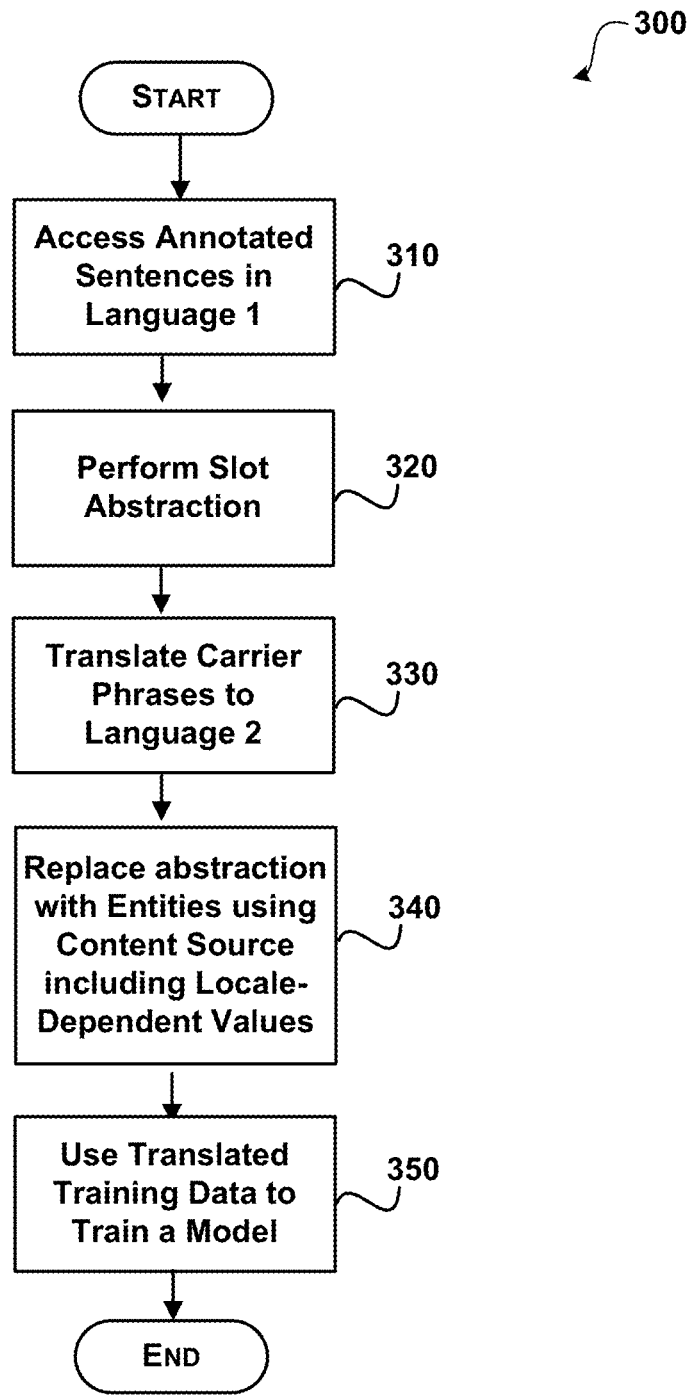
FIG. 3 shows a process for using training data in one language to create training data in another language.
Figure 4:
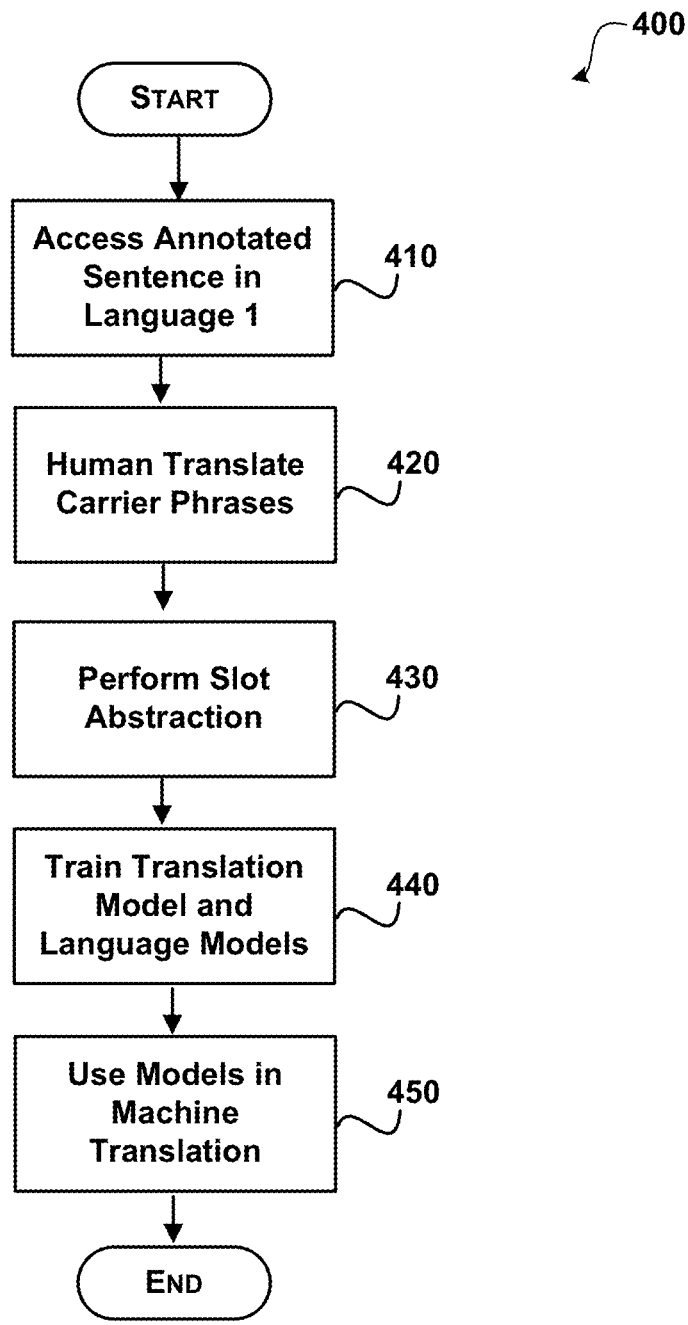
FIG. 4 illustrates a process for performing partial human translation on training data.
Figure 5:
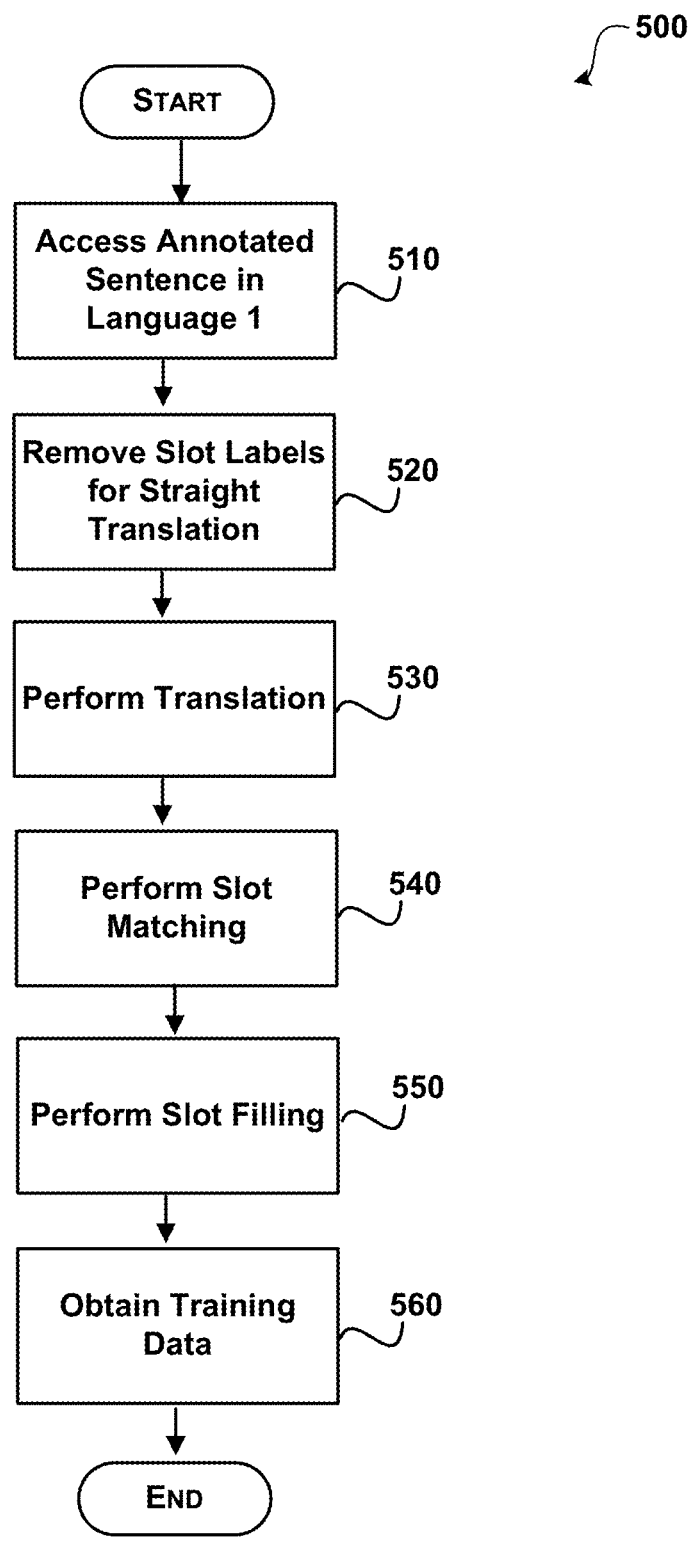
FIG. 5 shows a process for using straight translation to create training data.

FIGS. 3-5 illustrate processes for creating training data. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

FIG. 3 shows a process for using training data in one language to create training data in another language.

After a start operation, process 300 moves to operation 310, where training data in a first language is accessed. For example, the training data may include annotated sentences in English or some other language. The sentences in the training data may be manually annotated or automatically annotated.

Flowing to operation 320, slot abstraction on the annotated sentences is performed. The slot labels, carrier phrase(s) and the slot(s) are determined for each annotated sentence. A carrier phrase is a portion of the sentence that is not a slot label or a slot value. For example, in the sentence "albums out <music_release_date> this week <music_release_date>" the carrier phrase is "albums out." The slot value is "this week" and the slot label is "music_release_date." A token replaces each slot label and the corresponding slot value. For example, the "albums out <music_release_date> this week <music_release_date>" becomes: albums out ${music_release_date}.

Transitioning to operation 330, the carrier phrases are translated from the first language to the second language. The carrier phrases may be translated using machine translation or human translation, or some combination of machine translation and human translation. The machine translation may include the use of general translators and domain-specific translators.

Moving to operation 340, the tokens are replaced with entities. Generally, entities that are locale-dependent (e.g., album names, city names . . . ) are replaced with locale-dependent values. For example, the locale-dependent values may be obtained from content sources storing locale-dependent entities. Locale-dependent entities may also be determined using other methods (e.g., search, manual input, and the like). The selection of an entity for a slot value can be random, based on the popularity of an entry, based on a frequency of an entry, and the like.

Transitioning to operation 350, the training data that is created from the process can be used to train a model. For example, a model used by a Conversational Understanding System may be trained to support language 2.

The process then moves to an end operation and returns to processing other actions.

FIG. 4 illustrates a process for performing partial human translation on training data.

After a start operation, process 400 moves to operation 410, where training data in a first language is accessed. For example, the training data may include annotated sentences in English or some other language. The sentences in the training data may be manually annotated or automatically annotated.

Flowing to operation 420, partial human translation is performed on at least a portion of the annotated training data. Partial translations are determined by translators (e.g., native speakers) for a limited number of sentences. For example, partial human translation may be performed on 2000-5000 sentences per domain for the carrier phrases of the sentences. According to an embodiment the slot labels and the slot values are not translated but the human translator may reorder the words in the sentence.

Transitioning to operation 430, slot abstraction on the annotated sentences is performed as described above. In the partial human translation example shown in FIG. 2, the "albums out <music_release_date> this week <music_release_date>" becomes: albums out ${music_release_date} or ${music_ release_} 出版的专辑 due to word reordering when translating from English to Chinese.

Transitioning to operation 440, the translated sentences are then used to train a domain specific translation model and a language model. In this way, the tokens that replace the slot labels and the slot values are no longer considered OOV anymore by the translator. The domain specific models may also include general translation "rules" where slot surrogates serve as placeholders, as in (weather in ${city}, ${city}的天气).

Moving to operation 450, the translation model and the language model may be used during machine translation of the annotated training sentences. For example, the models may be used for machine translation or straight translation as described herein.

The process then moves to an end operation and returns to processing other actions.

FIG. 5 shows a process for using straight translation to create training data.

After a start operation, process 500 moves to operation 510, where training data in a first language is accessed. For example, the training data may include annotated sentences in English or some other language. The sentences in the training data may be manually annotated or automatically annotated.

Flowing to operation 520, the slot labels are removed from the training data and the slot values are extracted. For example, the sentence "albums out <music_release_date> this week <music_release_date>" becomes "albums out this week" and "this week".

Transitioning to operation 530, the stripped phrases are translated from the first language to the second language. The phrases may be translated using machine translation or human translation, or some combination of machine translation and human translation. The machine translation may include the use of general translators and domain-specific translators. More than one translation may be selected for each phrase.

Moving to operation 540, slot matching is performed. Slot matching places the slot label that was removed in operation 520 back into the translated sentence. The slot matching may be performed manually or automatically.

Transitioning to operation 550, slot filling may be performed. As discussed herein, slot filling replaces the tokens with entities. Additional or alternative entities may also be determined for the slot values.

Transitioning to operation 560, the training data that is created from process 500 can be used to train a model. For example, the training data that is created from process 500 may be used alone or in combination with the other training data that is created using the processes described herein to train a model used by a Conversational Understanding System may be trained to support language 2.

The process then moves to an end operation and returns to processing other actions.

Figure 6:
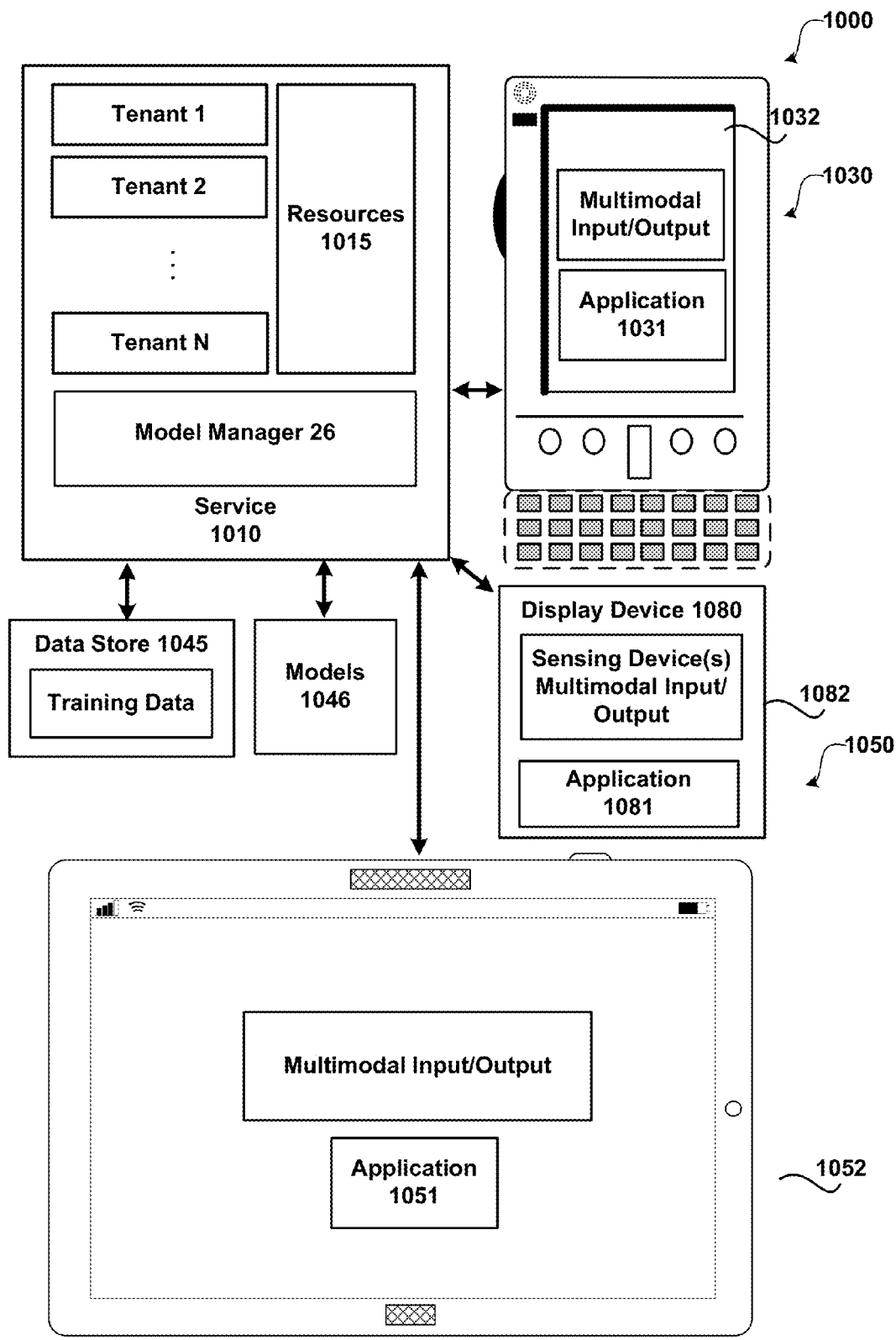
FIG. 6 illustrates an exemplary online system that uses a model trained from training data that is created from training data in another language.

FIG. 6 illustrates an exemplary online system that uses a model trained from training data that is created from training data in another language. As illustrated, system 1000 includes service 1010, data store 1045, models 1046, touch screen input device 1050 (e.g. a slate), smart phone 1030 and display device 1080.

As illustrated, service 1010 is a cloud based and/or enterprise based service that may be configured to provide services, such as multimodal services related to various applications (e.g. searching, games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal applications and each include an application (1031, 1051, 1081) that is configured to receive speech input.

As illustrated, touch screen input device 1050, smart phone 1030, and display device 1080 shows exemplary displays 1052/1032/1082 showing the use of an application using multimodal input/output. Data may be stored on a device (e.g. smart phone 1030, touch screen input device 1050 and/or at some other location (e.g. network data store 1045). Data store 1045, or some other store, may be used to store training data as well as other data (e.g. language models). The applications used by the devices may be client based applications, server based applications, cloud based applications and/or some combination. According to an embodiment, display device 1080 is a device such as a MICROSOFT XBOX coupled to a display.

Model manager 26 is configured to perform operations relating to creating training data as described herein. While manager 26 is shown within service 1010, the functionality of the manager may be included in other locations (e.g. on smart phone 1030 and/or touch screen input device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
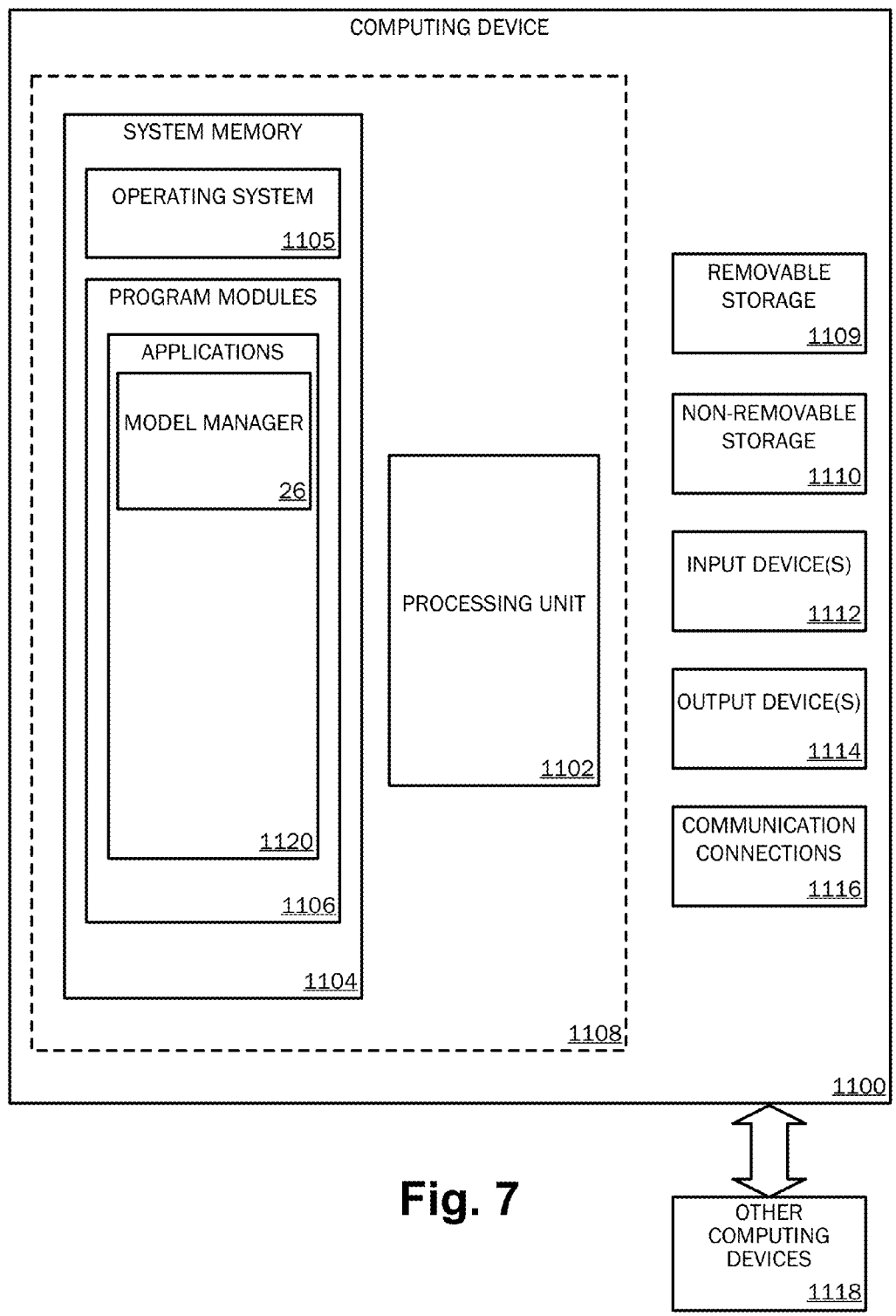
FIGS. 7, 8A, 8B, and 9 and the associated descriptions provide a discussion of a variety of operating environments in which embodiments of the invention may be practiced.
Figure 8A:
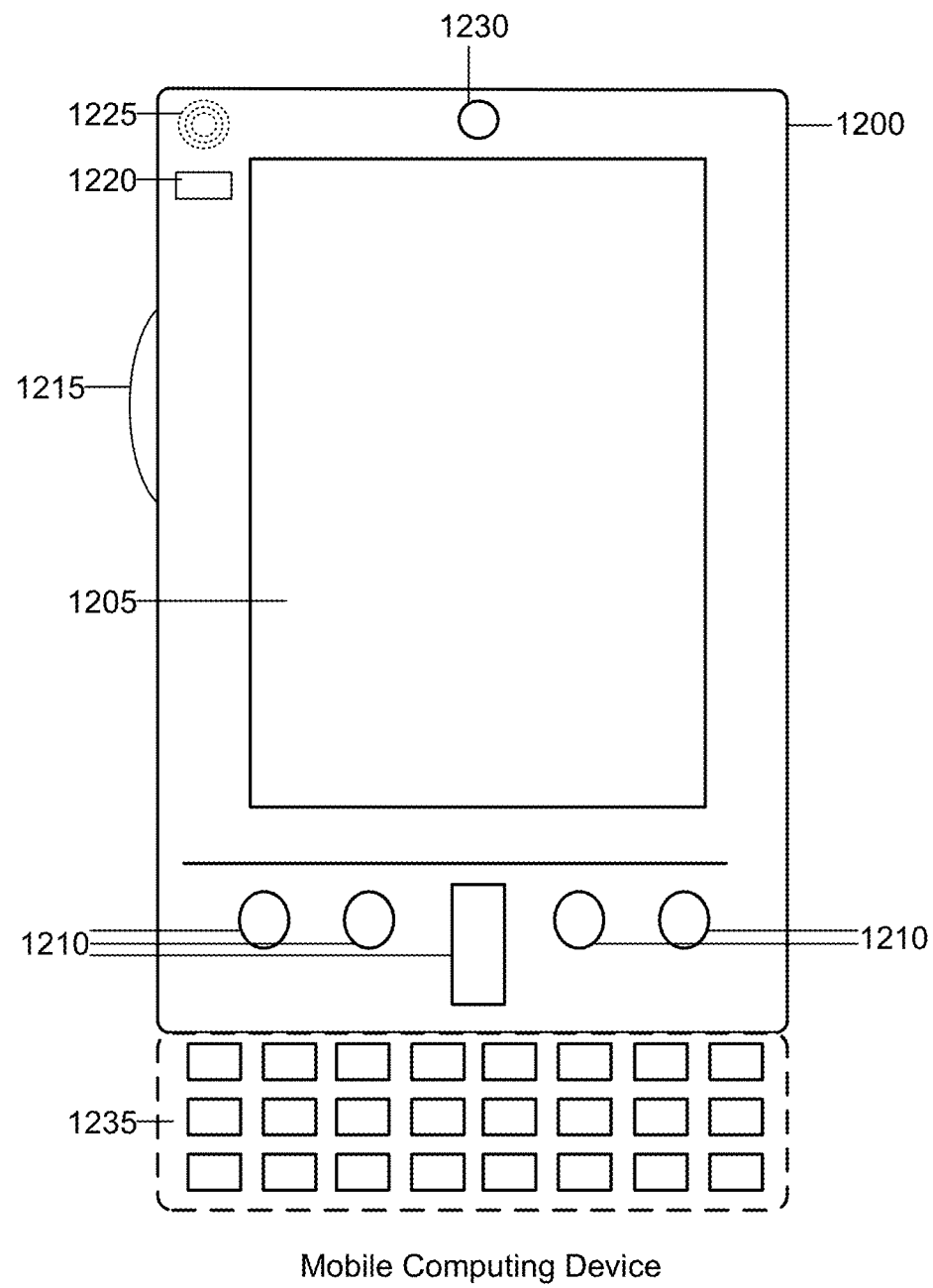
Figure 8B:
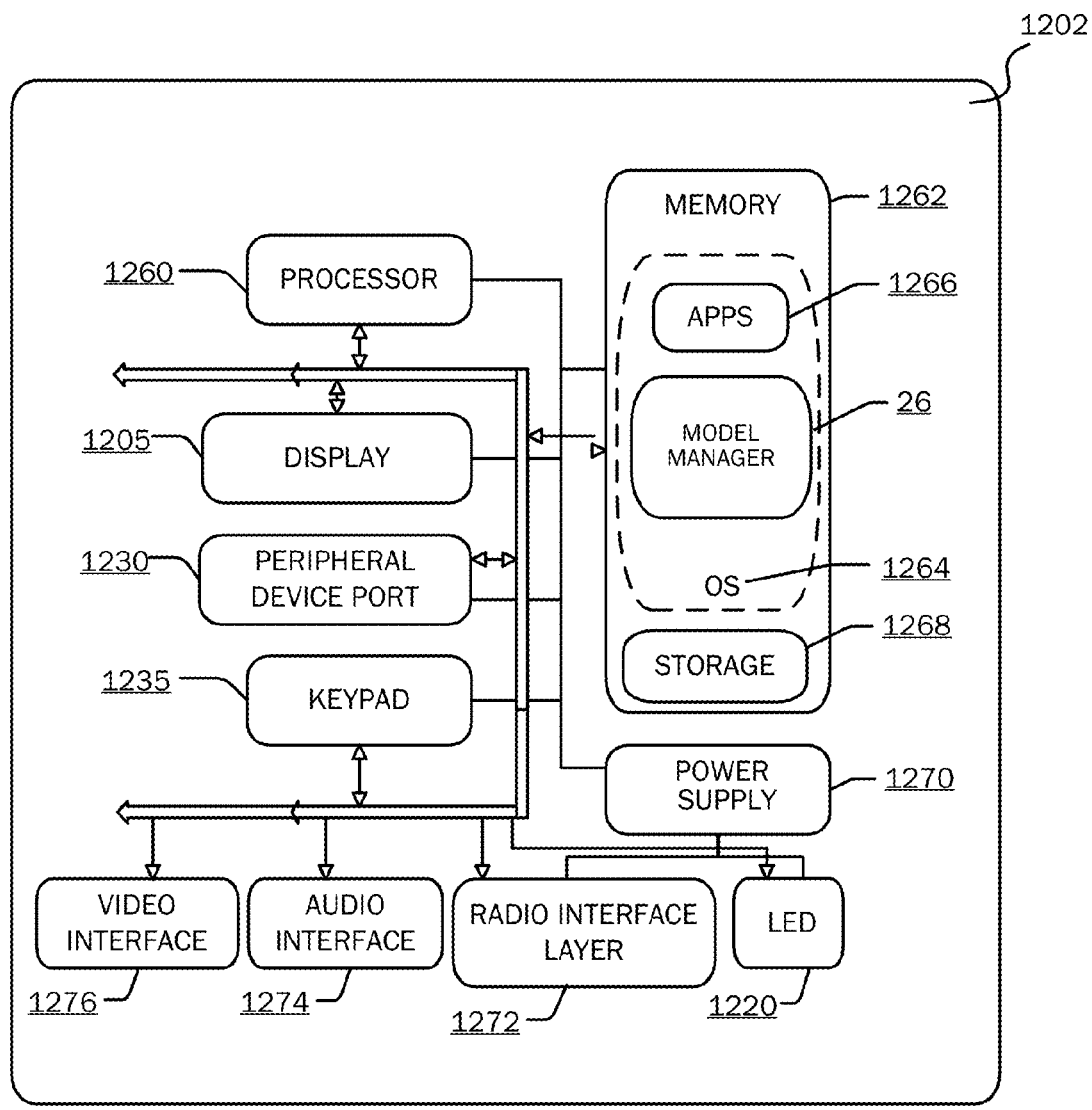
Figure 9:
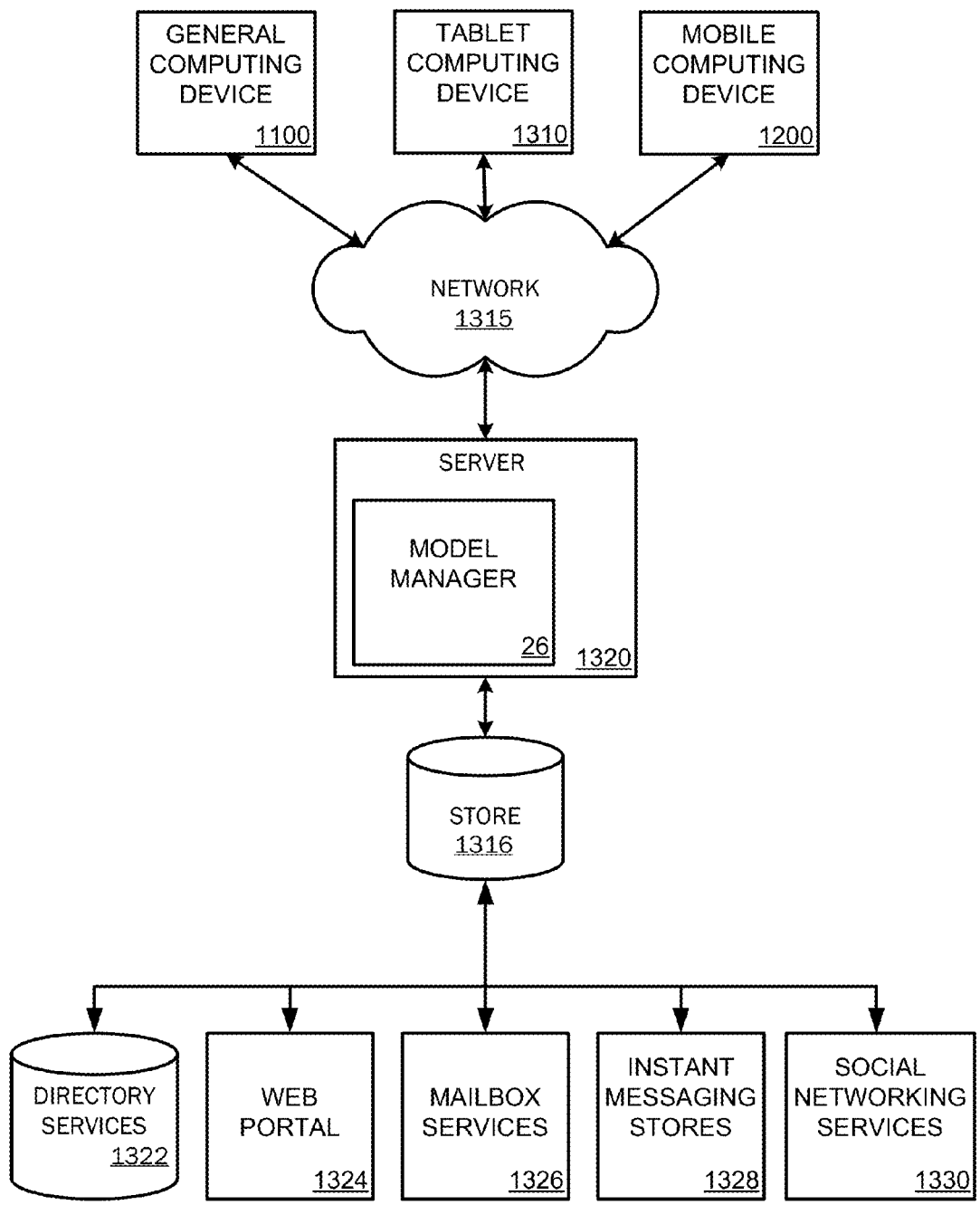

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the model manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 7 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 7 by a removable storage device 1109 and a non-removable storage device 1110.

As stated above, a number of program modules and data files may be stored in the system memory 1104. While executing on the processing unit 1102, the program modules 1106 (e.g., the model manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the model manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 1200, for example, a mobile telephone, a smart phone, a tablet personal computer, a laptop computer, and the like, with which embodiments of the invention may be practiced. With reference to FIG. 8A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the model manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 8B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 9 illustrates an embodiment of architecture of an exemplary system, as described above. Content developed, interacted with, or edited in association with the model manager 26 may be stored in different communication channels or other storage types. For example, various documents may be stored using a directory service 1322, a web portal 1324, a mailbox service 1326, an instant messaging store 1328, or a social networking site 1330. The model manager 26 may use any of these types of systems or the like for enabling data utilization, as described herein. A server 1320 may provide the model manager 26 to clients. As one example, the server 1320 may be a web server providing the model manager 26 over the web. The server 1320 may provide the model manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-implemented method, performed by at least one processor, for using training data in a first language to create training data in a second language, comprising:

accessing the training data in the first language that include sentences that each comprises one or more carrier phrases, and one or more slot labels with slot values;

performing slot abstraction on at least a portion of the training data to create a first plurality of abstract sentences that each comprises one or more carrier phrases, and one or more abstract tokens that replace the slot labels and the slot values;

translating at least partially through machine translation the carrier phrases to the second language to generate a second plurality of abstract sentences in the second language;

accessing a database of a plurality of locale-dependent entities based on a locale corresponding to the second language;

replacing each of abstract tokens in the second plurality of abstract sentences in the second language with multiple locale-dependent entities from the plurality of locale-dependent entities for the slot type, in order to create a plurality of filled translated sentences for inclusion in the training data in the second language;

training a locale-dependent statistical model based on the training data in the second language; and recognizing speech in the second language based on the locale-dependent statistical model.

2. The method of claim 1, wherein translating the carrier phrases to the second language comprises using a domain specific translator.

3. The method of claim 1, wherein translating carrier phrases to the second language comprises using a domain specific translator and a general translator.

4. The method of claim 1, further comprising performing partial human translation to at least a portion of the training data in the first language to create sentences or a portion of the sentences in the second language and creating a domain-specific translation model using such sentences.

5. The method of claim 1, wherein translating carrier phrases to the second language comprises selecting a plurality of possible translations for at least a portion of each of the abstract sentences.

6. The method of claim 1, wherein replacing the abstract tokens with locale-dependent entities comprises at least one of: obtaining the locale-dependent values from a content source comprising locale-dependent entities for the second language or receiving the local-dependent entity during the translating.

7. The method of claim 1, further comprising performing a straight translation of at least a portion of the sentences in the training data after removing the slot labels.

8. The method of claim 7, further comprising performing slot matching on the at least the portion of the sentences in the training data.

9. The method of claim 1, further comprising training a slot model with the training data comprising three or more of: (a) a first portion of the sentences that were translated using machine translation on abstract sentences, followed by slot filling; (b) a second portion of the sentences whose carrier phrases were translated using a human, followed by slot values replaced by slot filling; (c) a third portion of the sentences that were translated using a straight translation; or (d) a fourth portion of the sentences wherein each slot value of the sentences in the third portion is replaced by an entity from slot filling.

10. A computer storage device storing computer-executable instructions for using training data in a first language to create training data in a second language, comprising:

accessing training data in the first language that include sentences that each comprises one or more carrier phrases, and one or more slot labels with slot values;

performing slot abstraction on at least a portion of the training data to create a first plurality of abstract sentences that each comprises one or more carrier phrases and, one or more abstract tokens that replace both the slot labels and the slot values;

translating at least partially through machine translation the carrier phrases to the second language using an adapted translator which comprises of a general translation system adapted with a domain-specific translation system to generate a second plurality of abstract sentences in the second language;

accessing a database of a plurality of locale-dependent entities based on a locale corresponding to the second language;

replacing each of the abstract tokens in the second plurality of abstract sentences in the second language with multiple locale-dependent entities from the plurality of locale-dependent entities to create a plurality of filled translated sentences for inclusion in the training data in the second language;

training a locale-dependent statistical model based on the training data in the second language;

receiving natural language input in the second language;

identifying an action from the natural language input based on the locale-dependent statistical model; and performing the identified action.

11. The computer storage device of claim 10, wherein translating the carrier phrases to the second language comprises using a partial human translation of at least a portion of the sentences in the training data.

12. The computer storage device of claim 11, further comprising using the partial human translation to create or update a new translation model.

13. The computer storage device of claim 10, wherein replacing the abstract tokens that are locale-dependent with locale-dependent values comprises at least one of: obtaining the locale-dependent values from a content source comprising locale-dependent entities for the second language or receiving the local-dependent entity during the translating.

14. The computer storage device of claim 10, further comprising performing a straight translation of at least a portion of the sentences in the training data after removing the slot labels, and inserting back the slot labels after performing the straight translation.

15. The computer storage device of claim 10, further comprising training a slot model with the training data comprising one or more of: a first portion of the sentences that were translated using machine translation; a second portion of the sentences that were translated using a human; or a third portion of the sentences that were translated using a straight translation.

16. A system for using training data in a first language to create training data in a second language, comprising:
a memory and a processor that are configured to perform actions, comprising:
accessing annotated training data in the first language that include sentences that each comprises one or more carrier phrases, and one or more slot labels and slot values;

performing slot abstraction on at least a portion of the training data to create a first plurality of abstract sentences that each comprises one or more carrier phrases and one or more abstract tokens that replace the slot labels and the slot values;

translating the carrier phrases to a second language using an adapted translator comprising of a general translation system and a domain-specific machine translation system to generate a second plurality of abstract sentences in the second language;

accessing a database of a plurality of locale-dependent entities based on a locale corresponding to the second language;

replacing each of the abstract tokens with multiple entities for the slot value including replacing the tokens that are locate-dependent with a locale-dependent entity from the plurality of locale-dependent entities to create a plurality of filled translated sentences for inclusion in the training data in the second language;

training a slot-tagging model using the training data in the second language;

receiving natural language input in the second language;

identifying an action from the natural language input based on the statistical model; and performing the identified action.

17. The system of claim 16, wherein translating the abstract sentences to the second language comprises selecting a plurality of possible translations for at least a portion of each of the abstract sentences.

18. The system of claim 16, wherein replacing the tokens that are locale-dependent with locale-dependent values comprises at least one of: obtaining the locale-dependent values from a content source comprising locale-dependent entities for the second language or receiving the local-dependent entity during the translating.

19. The system of claim 16, further comprising performing a straight translation of at least a portion of the sentences in the training data after removing the slot labels and replacing the slot labels after performing the straight translation.

20. The method of claim 1, wherein translating the carrier phrases produces more carrier phrases in the second language than in the first language by generating more than one translation for at least one of the carrier phrases.

* * * * *